Patented Sept. 21, 1937

2,093,424

UNITED STATES PATENT OFFICE 2,093,424

DYE DISPERSIONS

Leonard P. Dove, Crete, Ill.

No Drawing. Application September 11, 1934, Serial No. 743,617

7 Claims. (Cl. 134—48)

This invention relates to the preparation of dye solutions from dyes, (aniline, vegetable, mineral) heretofore generally regarded as soluble or dispersable in water only, including coal tar dyes, etc. Many dyes, generally classed as water soluble have desirable properties such as being unusually fast to light or washing, the usefulness of which dyes has been limited due to the presence of water used to dissolve them. It has been long recognized that some method to render these dyes soluble in other media than water would greatly extend their use and in many cases save considerable expense in coloring a number of materials.

As one illustration of the many useful applications of this invention is the preparation of non-aqueous wood stains or dye solutions for coloring wood. Heretofore water dye solutions for stains have been prepared in water solutions and when applied to the wood the water present loosens the fibers of the wood resulting in grain raising or fuzzing or roughening of the wood. To overcome this a wood finisher is put to considerable expense to make the wood smooth again in preparation for the finish of oil, shellac, varnish, lacquer or enamel. In spite of this trouble and expense many wood finishers have still adhered to the use of these water dyes in water solution because of their fastness to light and other desirable properties.

Having mentioned but one of many advantages that will result from the application of my invention I will now disclose the method of preparing dye solutions from water dyes without the necessary aid of water for dissolving.

For my dye solutions any one of a large number of glycol ethers may be employed and the following, although appearing in the order of preference, are listed merely as illustrative:

1. Ethylene glycol mono ethyl ether
2. Ethylene glycol mono methyl ether
3. Ethylene glycol mono iso propyl ether
4. Ethylene glycol mono n-propyl ether
5. Ethylene glycol mono iso butyl ether
6. Ethylene glycol mono n-butyl ether
7. Propylene glycol mono ethyl ether
8. Propylene glycol mono methyl ether
9. Propylene glycol iso propyl ether
10. Propylene glycol n-propyl ether As a typical example of the application of my invention the following will illustrate the general principle of the operations without limiting this invention to the specific materials or quantities used.

Example 1

Ten parts by weight or orange Y (a common commercial acid dye) Schultz No. 145, Color Index 151 are dissolved or pasted with from 10 to 100 parts by weight of ethylene glycol resulting in more or less complete solution. To this mixture are added from 50 to 500 parts by weight of ethylene glycol mono ethyl ether whereupon the dye solution is further diluted or dispersed resulting in a stable solution or dispersion of the dye. This dye solution may be further diluted or thinned with ethyl alcohol, methyl alcohol or benzol or a mixture of these solvents without precipitation of the dye.

Example 2

Ten parts by weight of croceine scarlet MOO (a common commercial water dye) Schultz No. 227, Color Index 252 are added to 50–100 parts by weight of ethylene-glycol-mono-butyl-ether and stirred or agitated until the solution is more or less complete. The clear solution of the dye may be decanted or removed by other well known means from any insoluble matter. If desired this dye solution may be further diluted or thinned with methyl alcohol, ethyl alcohol or other suitable organic solvent more or less free from water, without appreciable separation of the dye from solution.

It is not definitely known why the derivatives of the ethylene series of hydrocarbons render dyes, otherwise soluble in water, soluble in media virtually without water.

In certain cases these dyes belong to the so called "acid dyes" having a more or less labile hydrogen atom or ion. It is possible that this atom or ion combines loosely with the carbon in the ethylene compound or with one of the groups or atoms attached to the carbon atoms and thus changes the dye to one stable in non-aqueous solvents.

Another possibility is that the dye becomes colloidal through gaining an electric charge on the colloidal particle, this charge in turn being sufficient to keep the particles from agglomerating and results in a dispersoid or colloidal solution stable to thinners or media not otherwise a solvent. The ethers of ethylene glycol are specially effective in keeping the dye stable in the absence of water.

These explanations are given as suggestions only and are not essential to the practice of rendering dyes soluble in non-aqueous solvents.

It is further not critical to this invention that water be absent in the preparation of these dye solutions since measurable percentages of water may be present accidentally or be added without interference except as the water may be undesirable as a constituent of the mixture.

The use of these water soluble dyes is thus greatly extended by the fact that they may be used in solutions or dispersions containing an organic solvent and in which water is present to a substantial extent but insufficient in amount to interfere with desirable use of the composition as for example, for wood staining. While in prior art compositions as pointed out above, the use of aqueous solutions of the water soluble dyes gave rise to grain raising, compositions of the present invention even though containing water as set forth above can be produced substantially free from undesirable grain raising by inclusion of the organic solvents. The organic solvents referred to may be those of the glycol (ethylene) series of organic compounds including the glycols such as ethylene glycol and the glycol ethers referred to above. These compounds are particularly valuable in the preparation of wood stains. They are of relatively high boiling point even the lowest member of the glycols (ethylene glycol) having a boiling point above that of water. Other types of organic solvents may be utilized for particular purposes including glycerol, triethanolamine, etc., either alone or in combination with the thinners and diluents referred to above including the alcohols such as methyl and ethyl alcohol, the members of the benzene series of hydrocarbons, such as benzol and toluol, etc. The fact that water may be present enables the organic solvents and diluents to be used which are not free from water; or the dyes may first be dissolved in a small amount of water, and the desired organic vehicles, solvents and/or diluents incorporated.

Having thus set forth my invention, I claim:

1. A dye solution for use as a wood stain, consisting of a dye dissolved in water, and organic solvent means miscible therewith to remain behind after the water has evaporated.

2. A dye solution for use as a wood stain, consisting of a dye dissolved in water, an organic solvent miscible therewith and having a slower-evaporating rate than the water, and an organic solvent which evaporates faster than water.

3. A dye solution for use as a wood stain, consisting of a dye dissolved in water and monoethyl ether of ethylene glycol, the water being present in an amount sufficient to act as at least a partial solvent for the dye without interfering with the use of the composition as a wood stain.

4. A dye solution for use as a wood stain consisting of a water-soluble aniline dye, an organic solvent, and an amount of water sufficient to act as at least a partial solvent for the dye without interfering with the use of the composition as a wood stain.

5. A dye in dispersion consisting of a water-soluble aniline dye, a member of the group consisting of the ethylene glycols and alkyl ethers of the ethylene glycols, and an amount of water sufficient to act as at least a partial solvent for the dye without interfering with the use of the composition as a wood stain.

6. A dye in dispersion consisting of a water-soluble aniline dye, a member of the group consisting of the ethylene glycols and alkyl ethers of the ethylene glycols, a common organic solvent, and water in an amount sufficient to act as at least a partial solvent for the dye without interfering with the use of the composition as a wood stain.

7. A dye solution for use as a wood stain consisting of a water-soluble aniline dye, water in an amount sufficient to act as at least a partial solvent for the dye without interfering with the use of the composition as a wood stain, a high-boiling organic solvent miscible therewith, and a low-boiling organic diluent selected from the group consisting of alcohols and members of the benzene series of hydrocarbons.

LEONARD P. DOVE.